United States Patent [19]
Kojima

[11] Patent Number: 5,412,450
[45] Date of Patent: May 2, 1995

[54] PHOTOGRAPHIC PRINTER

[75] Inventor: Masayuki Kojima, Wakayama, Japan

[73] Assignee: Noritsu Koki Co., Ltd., Wakayama, Japan

[21] Appl. No.: 191,205

[22] Filed: Feb. 3, 1994

[30] Foreign Application Priority Data

Feb. 5, 1993 [JP] Japan .................................. 5-018612

[51] Int. Cl.6 ........................ G03B 27/52; G03B 27/70
[52] U.S. Cl. ........................................ 355/43; 355/51; 355/65; 355/66
[58] Field of Search ..................... 355/43, 45, 51, 65, 355/66

[56] References Cited

U.S. PATENT DOCUMENTS

| | | | |
|---|---|---|---|
| 4,857,965 | 8/1989 | Ishii et al. | 355/45 |
| 5,006,886 | 4/1991 | Suzuki | 355/46 |

FOREIGN PATENT DOCUMENTS

| | | |
|---|---|---|
| 1580582 | 9/1969 | France . |
| 3412691 | 10/1985 | Germany . |
| 4002675 | 8/1990 | Germany . |
| 4003549 | 8/1990 | Germany . |
| 2267354 | 12/1993 | United Kingdom . |

Primary Examiner—Richard A. Wintercorn
Attorney, Agent, or Firm—Wenderoth, Lind & Ponack

[57] ABSTRACT

A photographic printer for printing negative images on a negative film onto photographic paper. The printing direction can be changed over between "lateral" and "longitudinal" without changing the feed direction of the negative film. A reflecting mirror is inclined by 45° with respect to the optical axis of the light emitted from a light source to the negative film and is supported to be rotatable about the optical axis. A driving unit is provided to rotate the reflecting mirror by 90° about the optical axis between a reference position and a second position. Exposure stages are provided on the optical axes of the light beams reflected by the reflecting mirror when the mirror is in its reference position and second position, respectively. The photographic paper is guided through the exposure stages. According to the position of the mirror, negative images are printed on the paper at one of the two exposure stages. Thus, the printing position can be changed over between lateral and longitudinal by turning the mirror between its reference position and second position.

1 Claim, 9 Drawing Sheets

PHOTOGRAPHIC PRINTER

This invention relates to a photographic printer for printing negative images on a negative film onto a web of photographic paper.

Figure 9A:
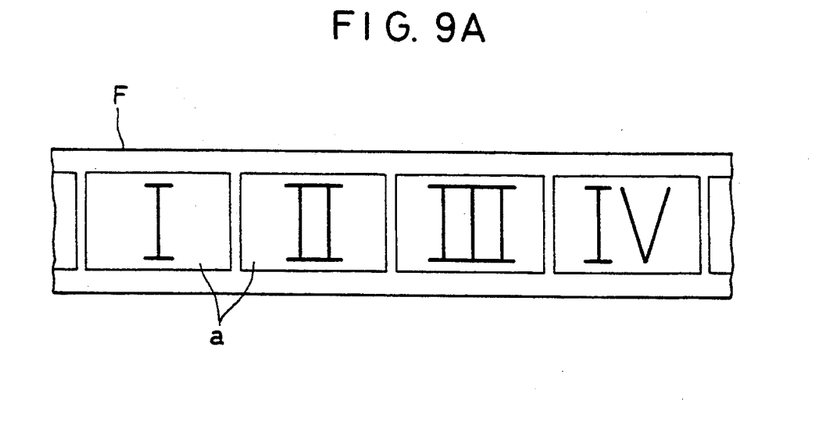
FIG. 9A is a plan view of a negative film.
Figure 9B:
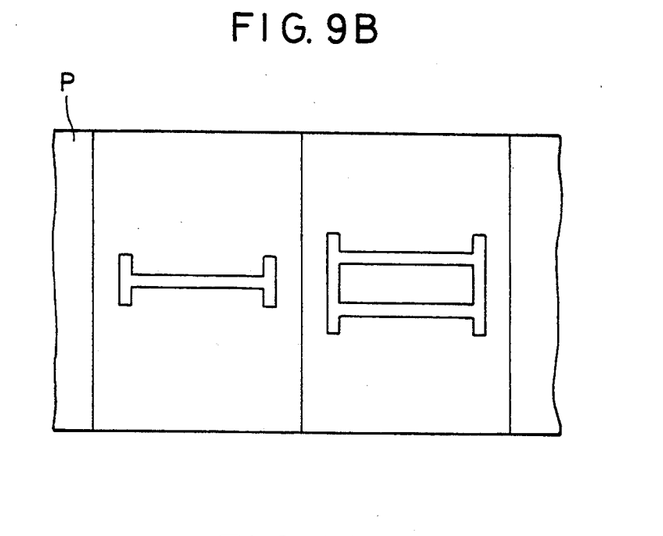
FIG. 9B is a plan view of a web of photographic paper onto which are laterally printed the negative images on the negative film of FIG. 9A.
Figure 9C:
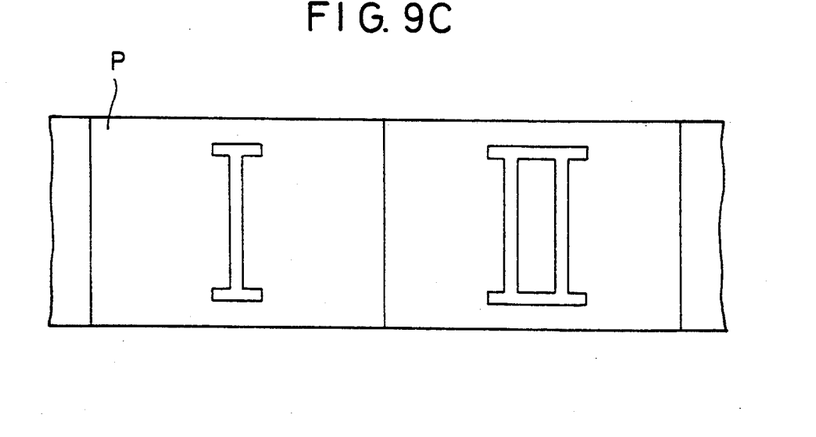
FIG. 9C is a plan view of photographic paper onto which are longitudinally printed the negative images on the negative film of FIG. 9A.

Generally, the negative images on a negative film F as shown in FIG. 9A are printed on photographic paper in the manner as shown in FIG. 9B or 9C.

In the method of FIG. 9B, the image on each frame a of the negative film F is printed on the paper P so that the long sides of the frame correspond to the width direction of the paper P. This method is called "lateral printing". The method of FIG. 9C is called "longitudinal printing" because the images are printed so that the short sides of the frames a correspond to the width direction of the paper P.

Figures 10A, 10B:
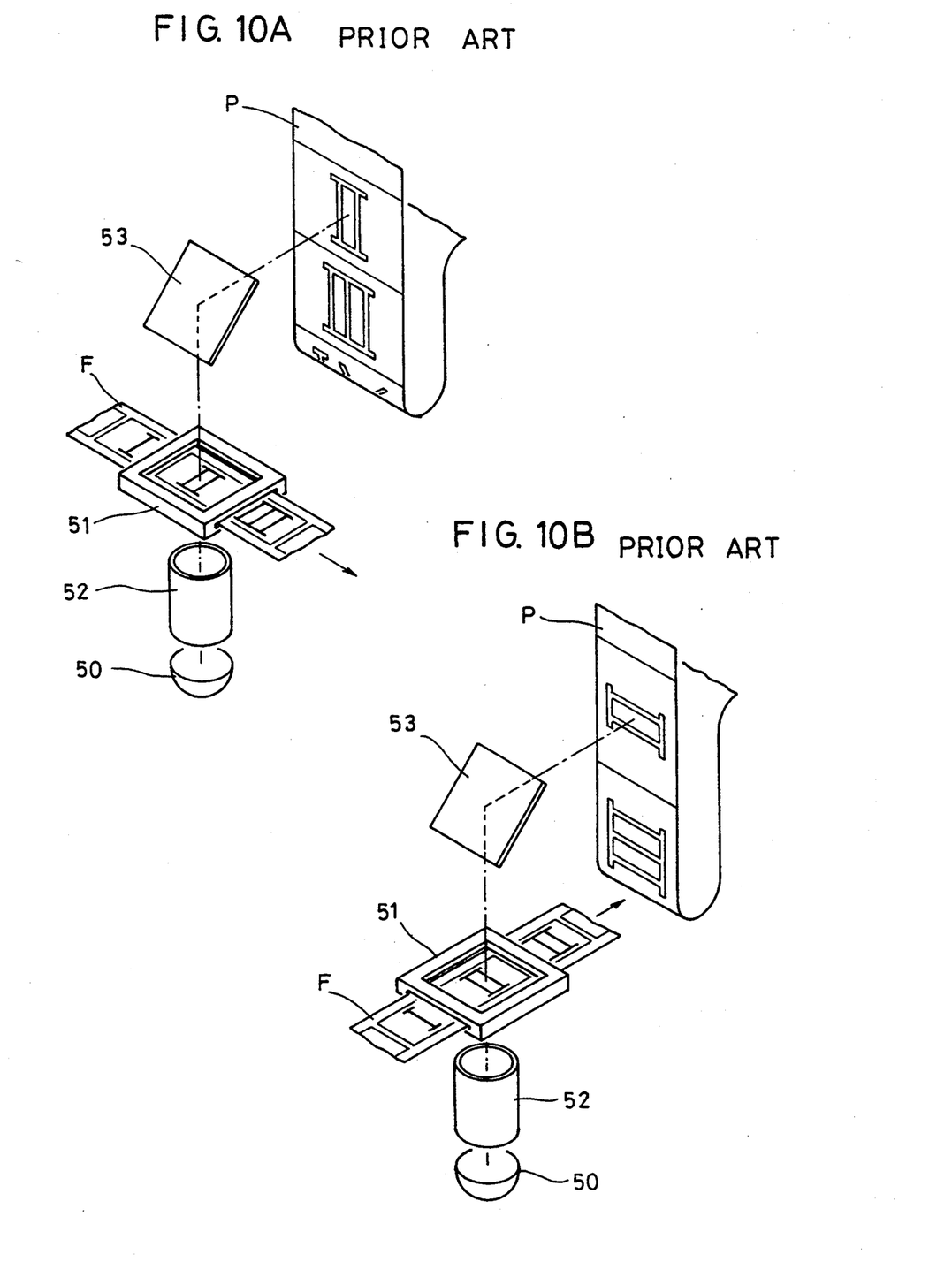
FIG. 10A is a perspective view of a conventional photographic printer showing the arrangement in which the negative images are printed laterally.
FIG. 10B is a perspective view of the same showing the arrangement for printing the negative images longitudinally.

FIGS. 10A, 10B show a conventional photographic printer. This photographic printer has a light source unit 50 for irradiating a negative film F carried by a negative mask 51. The negative images are enlarged by a printing lens 52, reflected by a mirror 53 and printed on photographic paper P.

The printing lens 52 may be provided between the light source unit 50 and the negative mask 51 or between the negative mask 51 and the mirror 53.

In order to "lateral-print" the negative images on the negative film F onto the paper P, the negative film F is fed laterally with respect to the photographic paper P, which is fed vertically as shown in FIG. 10A. For "longitudinal printing", the negative film has to be turned 90° from the above position to feed it in a longitudinal direction toward the paper P.

It is necessary to change the feed direction of the negative film not only when changing the printing direction, but when changing the print size e.g. from size E to size 2E or when the film size is changed from half-size to full-size.

As described above, printing work with conventional photographic printers was very troublesome because the feed direction of the negative film F had to be turned 90° every time there was a change in the printing direction of negative images, print size or film size.

In order to change the feed direction of the negative film F, it is necessary to support the negative mask 51 so as to be rotatable about the optical axis between the light source unit 50 and the negative mask 51, and to hold the negative mask 51 at predetermined positions. Such a negative mask supporting structure is complicated in structure and costly.

Moreover, since it is necessary to change the direction from which negative films F are inserted into the negative mask 51, it is difficult to automatically insert a negative film F into the negative mask 51.

It is an object of this invention to provide a photographic printer which permits change of the printing direction without changing the feed direction of the negative film so that the printing work can be done with high efficiency, which has a negative mask supporting structure which is simple in structure and which permits automatic insertion of negative films.

According to the present invention, there is provided a photographic printer comprising a light source unit for emitting light against a negative image surface on a negative film fed in one direction, a reflecting member aligned with the line connecting the light source unit and the negative image surface and inclined by a predetermined angle with respect to the optical axis of the light emitted from the light source unit, driving means for turning the reflecting member about the optical axis between a reference position and a second position, locking means for locking the reflecting member in one of the reference position and the second position, and exposure stages disposed on the optical axis of the light reflected by the reflecting member when it is in the reference position and in the second position, the negative film being fed to one of the exposure stages.

With the reflecting member of the photographic printer directed toward one of the exposure stages, the negative images on the negative film are printed onto photographic paper at the selected exposure stage. If it is desired to change the printing direction, the reflecting member is rotated by a predetermined angle until it faces the other exposure stage. It is not necessary to change the feed direction of the negative film. The negative images are now printed onto the photographic paper at the other exposure stage.

According to this invention, simply by turning the reflecting mirror by a predetermined angle, negative images can be selectively printed laterally or longitudinally onto photographic paper. It is not necessary to change the feed direction of the negative film. Thus, printing work can be done efficiently.

Since it is not necessary to change the feed direction of the negative film, the negative mask needs not be turned or otherwise moved. This makes it possible to simplify the supporting structure of the negative mask.

Since negative films can be inserted from the same direction, it is possible to feed them automatically.

Other features and objects of the present invention will become apparent from the following description made with reference to the accompanying drawings, in which.

Figure 1:
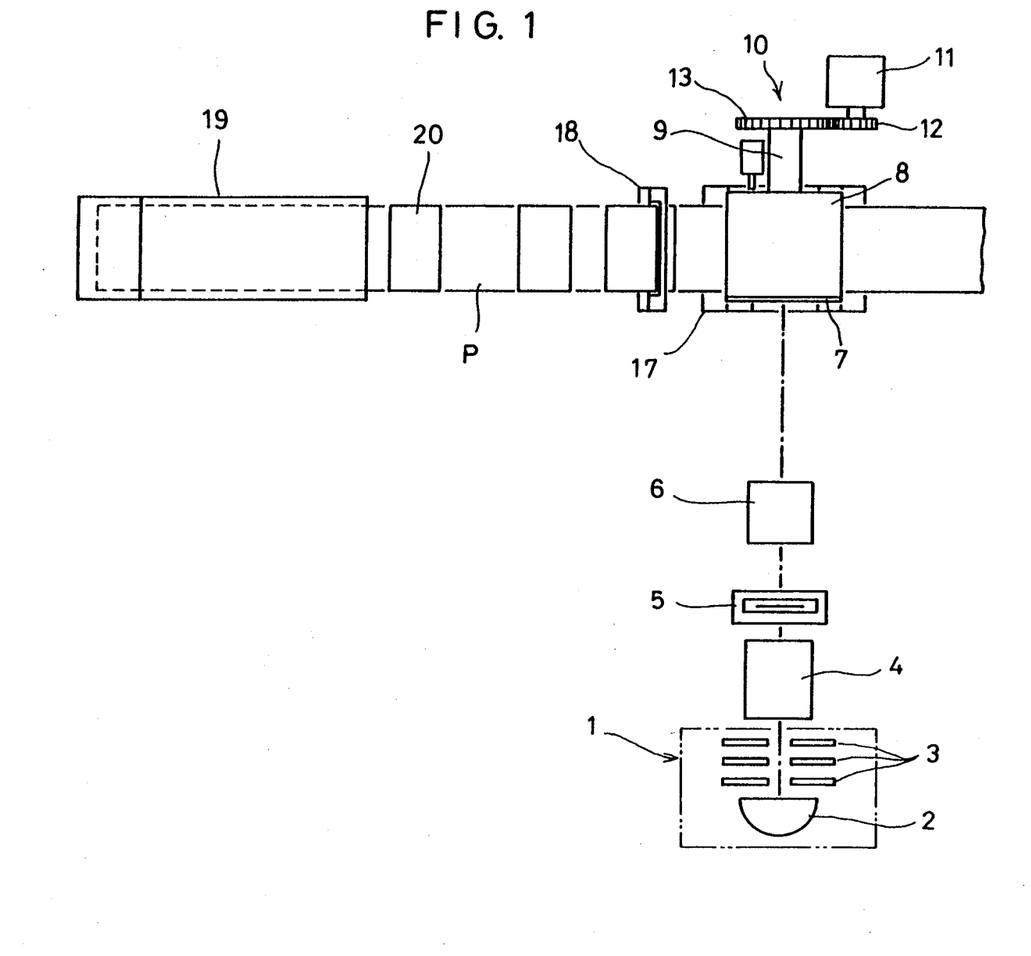
FIG. 1 is a plan view of the photographic printer according to this invention.
Figure 2:
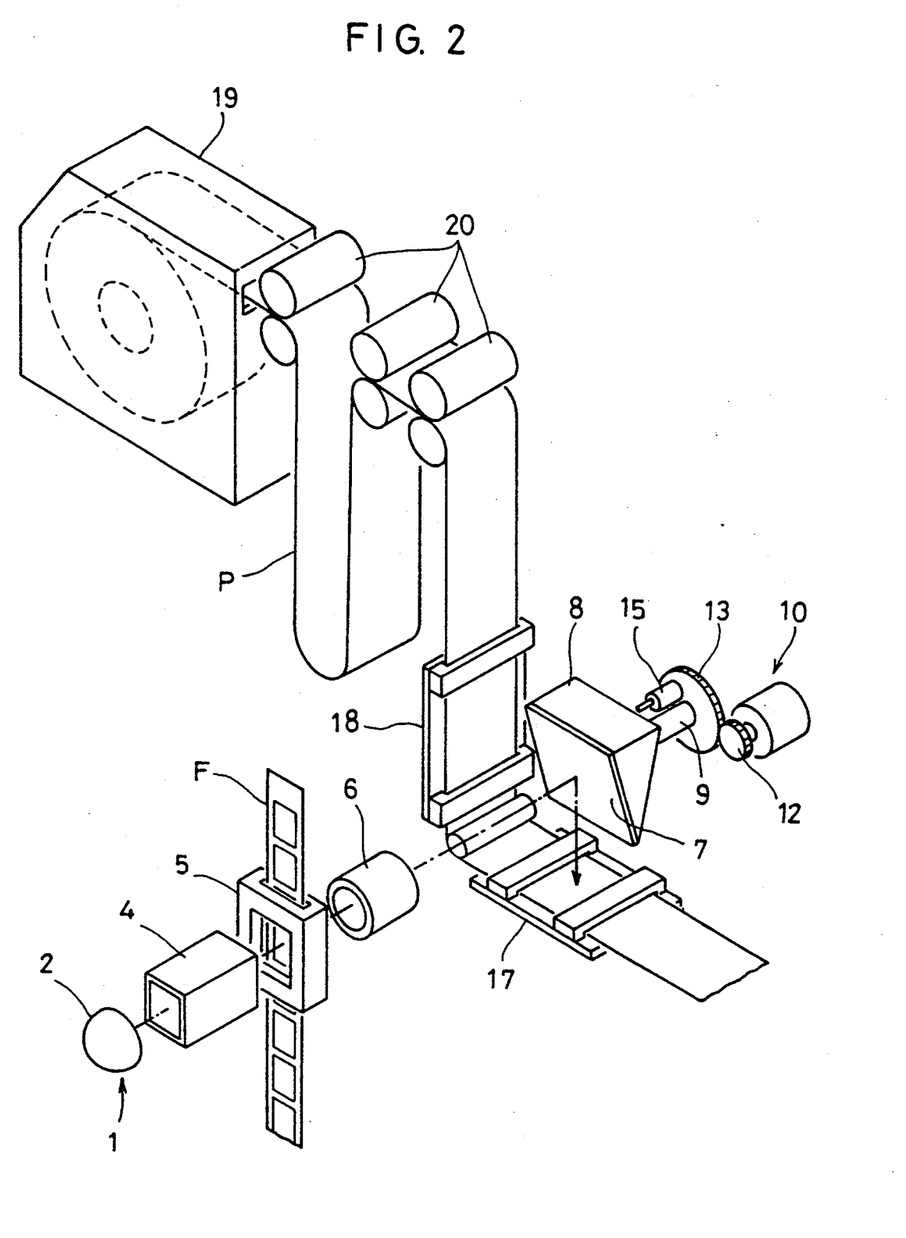
FIG. 2 is a perspective view of the same.

As shown in FIGS. 1 and 2, a light source unit 1 comprises a light source 2 and a plurality of light-toning filters 3 for adjusting the tone of the light emitted from the light source 2.

Along the optical axis of the light emitted from the light source unit 1 are arranged a light diffusing box 4, a negative mask 5 and a printing zoom lens 6. A negative film F is fed upwards through the negative mask 5.

Along the optical axis is also provided a reflecting mirror 7 as a reflecting member, which is inclined by an angle of 45 with respect to the incident optical axis. A mirror support 8 supporting the reflecting mirror 7 is provided on its back with a shaft 9 which is provided along and rotatable about the optical axis. The reflecting mirror 7 is rotated about the optical axis by a driving unit 10.

The reflecting mirror 7 may be replaced with a mirror-surfaced member made of a heat-resistant material such as plastics, metals such as iron, stainless steel and aluminum, and ceramics.

The driving unit 10 may be of any type. For example, it may have a lever (as 11' in FIG. 5) to rotate the reflecting mirror manually. In the embodiment, the driving unit has a motor 11 and a pair of gears 12, 13 which mesh with the rotary shaft of the motor 11 and the shaft 9, respectively, so that the shaft 9 is rotated by the motor 11.

Figure 3A:
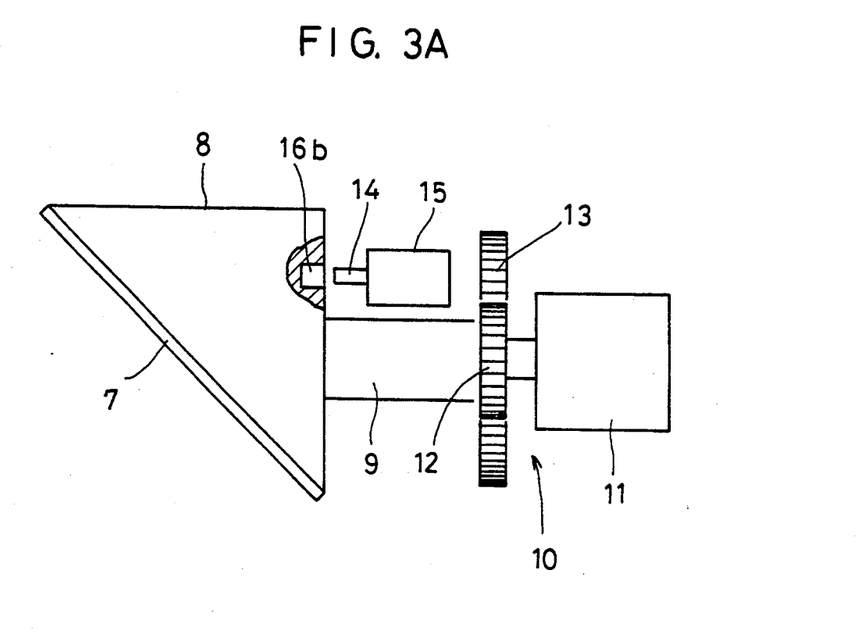
FIG. 3A is a partially cutaway side view of the reflecting mirror of the same.
Figure 3B:
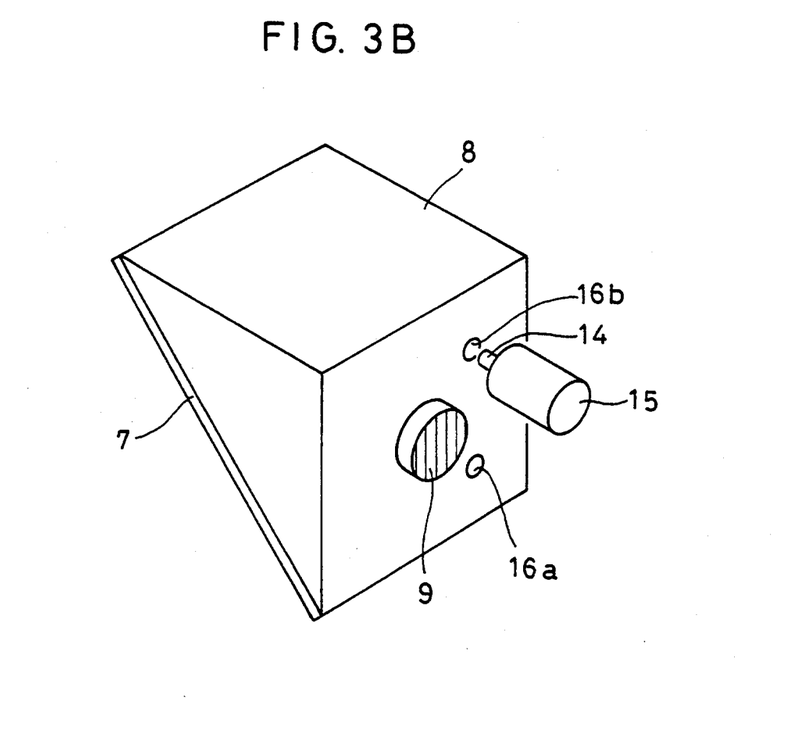
FIG. 3B is a perspective view of the reflecting mirror.

The driving unit 10 can rotate the reflecting mirror 7 from its reference position in which it faces downwards, by 90° in one direction to a second position. A locking mechanism is provided for locking the reflecting mirror 7 at the reference position and second position. It comprises, as shown in FIG. 3, a lock pin 14 located behind the mirror support 8, a solenoid 15 for axially moving the lock pin 14, and a pair of pin holes 16a, 16b formed in the back of the mirror support 8 at positions spaced apart 90° and by the same distance from the shaft 9. The reflecting mirror 7 can be unrotatably locked in position by inserting the lock pin 14 in either of the pin holes 16a, 16b.

A first exposure stage 17 is provided on the optical axis of the light reflected by the reflecting mirror 7 when it is in its reference position (FIG. 2). A second exposure stage 18 is provided on the optical axis of the light reflected by the reflecting mirror 7 when it is in its second position.

A web of photographic paper P, onto which are printed the negative images on the negative film F, is mounted in a magazine 19 in the form of a roll. The paper P is pulled out of the magazine 19 and guided through a plurality of guide rollers 20, the second exposure stage 18 and the first exposure stage 17 and further fed ahead by an unillustrated feeding device.

Figure 4A:
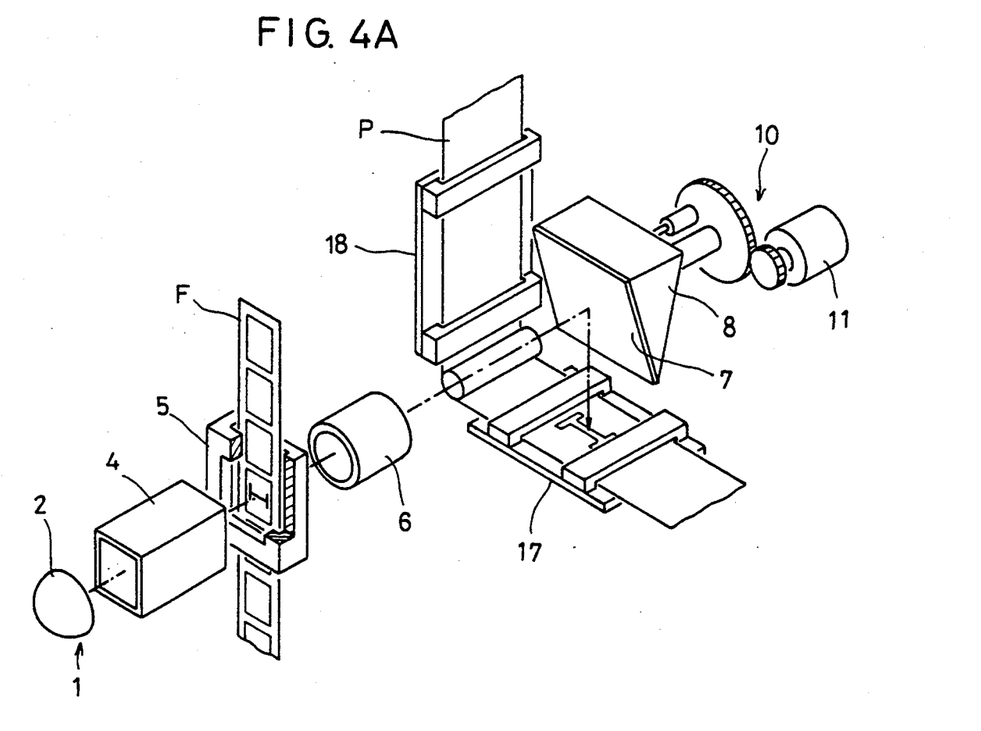
FIG. 4A is a perspective view of the same showing the arrangement for laterally printing the negative images on the negative film.

If it is desired to print the negative images on the negative film F shown in FIG. 9A onto the paper P at the first exposure stage 17, the film is passed through the negative mask 5 and the reflecting mirror 7 is directed toward the first stage as shown in FIG. 4A. In this state, light is emitted from the light source unit 1 toward the negative film. The negative images on the negative film are thus "laterally" printed onto the paper P at the first exposure stage 17.

Figure 4B:
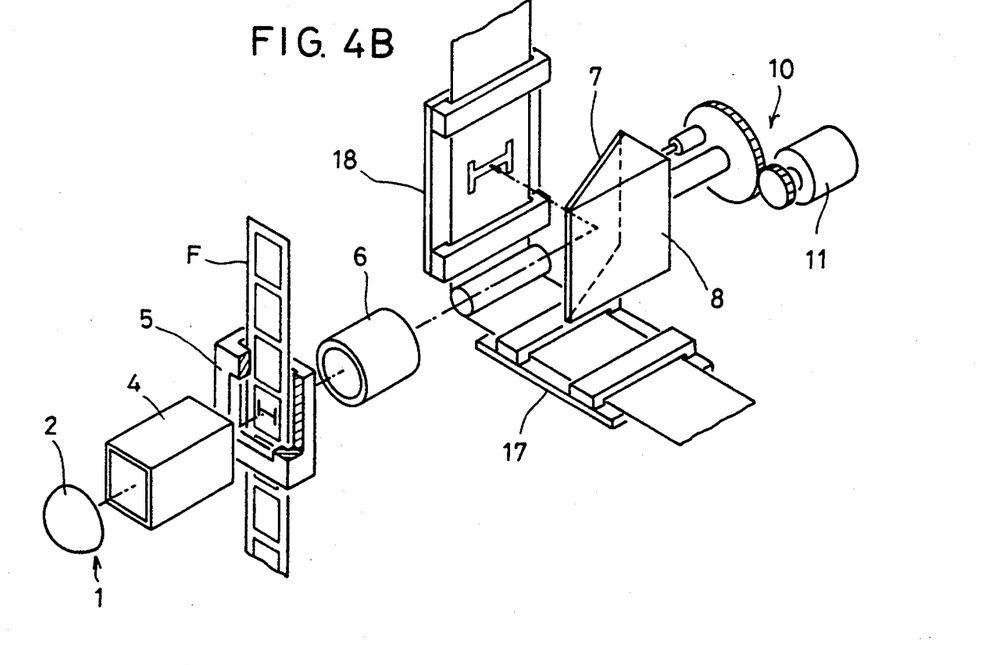
FIG. 4B is a similar perspective view showing the arrangement for longitudinally printing the negative images.

If it is desired to "longitudinally" print the negative images onto the paper P at the second exposure stage 18, the reflecting mirror 7 is directed toward the second exposure stage 18 as shown in FIG. 4B by turning it 90° with the driving unit 10.

Thus, the printing direction can be changed over simply by turning the reflecting mirror 7 by 90°. It is not necessary to change the feed direction of the negative film F as before. Thus, printing work can be done efficiently.

When printing negative images, separate negative films may be fed one by one or a plurality of negative films connected together with splice tape may be fed continuously.

Figure 5:
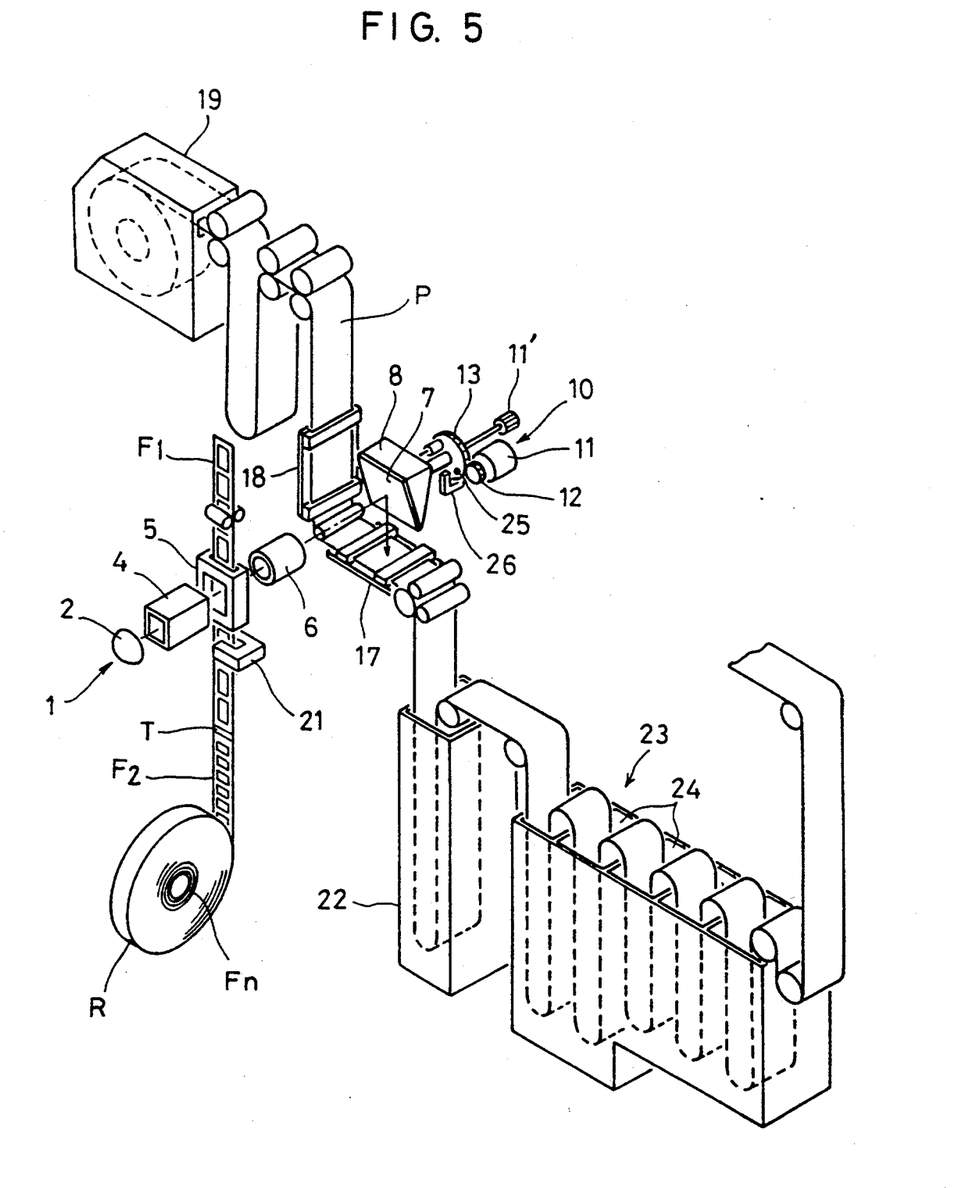
FIG. 5 is a perspective view of a photoprocessor having the photographic printer of FIG. 2.

FIG. 5 shows a photoprocessor equipped with the photographic printer according to this invention. A plurality of negative films F1, F2 . . . Fn, which are connected together with splicing tapes T, are wound into a roll R. They are pulled out of the roll R and fed through the negative mask 5 of the photographic printer. There is provided a negative image sensor 21 at the negative film inlet side of the negative mask 5 to distinguish the kind of the film being fed.

The photographic paper P is pulled out of the magazine 19 and guided through the second exposure stage 18 and the first exposure stage 17. The paper thus printed is then fed through a storage area 22 into a photographic paper developing apparatus 23, where it is dipped in developing tanks 24 containing different kinds of treating solutions for development.

A mirror position detecting sensor 26 is provided near the circumference of the gear 13 in the photographic printer to detect the position of the mirror 7 by detecting the position of a hole 25 formed in the gear 13.

We shall now describe the operation of the photoprocessor of this embodiment when printing the negative images on a 135-mm full-size (135F) negative film F1 and a 135-mm half-size (135H) negative film F2 which are spliced together. In this case, the negative images on the 135F negative film F1 are "laterally" printed, while those on the 135H negative film F2 are "longitudinally" printed.

When it is detected by the negative image sensor 21 that the negative film being fed is a 135F negative film F1, the driving unit 10 will be actuated to turn the reflecting mirror 7 to the first exposure stage 17. When the position detecting sensor 26 detects that the reflecting mirror 7 has been turned to the first exposure stage 17, the driving unit 10 will be deactivated, while at the same time, the solenoid 15 will be activated to lock the reflecting mirror 7. The printing zoom lens 6 is automatically adjusted to the magnification predetermined for a 135F film. In this state, the negative film F1 is fed frame by frame for printing.

When the printing of the 135F negative film F1 is complete and the negative image sensor 21 detects the subsequent 135H negative film F2, the reflecting mirror 7 will be unlocked and turned to the second exposure stage 18 by the driving unit 10. When the position detecting sensor 26 detects that the reflecting mirror 7 has been directed toward the second exposure stage 18, the driving unit 10 is stopped, while at the same time, the solenoid 15 is activated to lock the reflecting mirror 7. The printing zoom lens 6 is automatically adjusted to the magnification predetermined for a 135H film. In this state, the 135H negative film F2 is fed frame by frame for printing.

The printing zoom lens used in the embodiment may be replaced with a plurality of single-focal distance lenses corresponding to respective magnifications.

Figure 6:
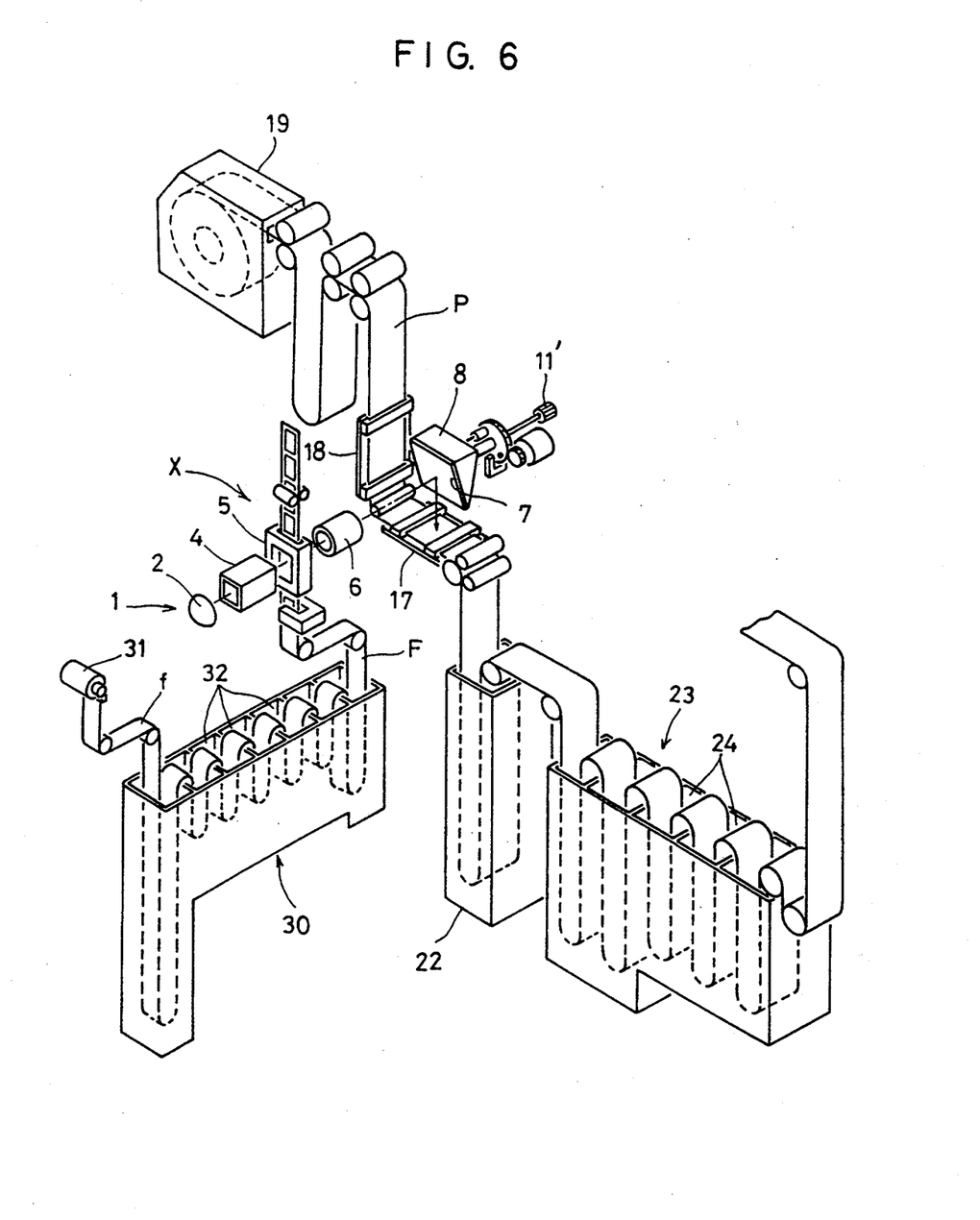
FIG. 6 is a perspective view of a different photoprocessor having the same photographic printer.

FIG. 6 shows another example of photoprocessor equipped with the photographic printer according to this invention. This processor comprises an automatic film developing apparatus 30, the photographic printer X according to this invention, and the automatic photographic paper developing apparatus 23. An undeveloped film f pulled out of a patrone 31 is dipped in a plurality of developing tanks 32 filled with different kinds of developing solutions for development. The thus developed negative film F is fed through the negative mask 5 in the photographic printer X to print its images onto a photographic paper P pulled out of the magazine 19.

The paper P thus printed is guided into the automatic photographic paper developing apparatus 23 for development. The photographic paper developing apparatus 23 is nothing different from that shown in FIG. 5. Thus, their parts are denoted by the same numerals and their description is omitted.

Figure 7:
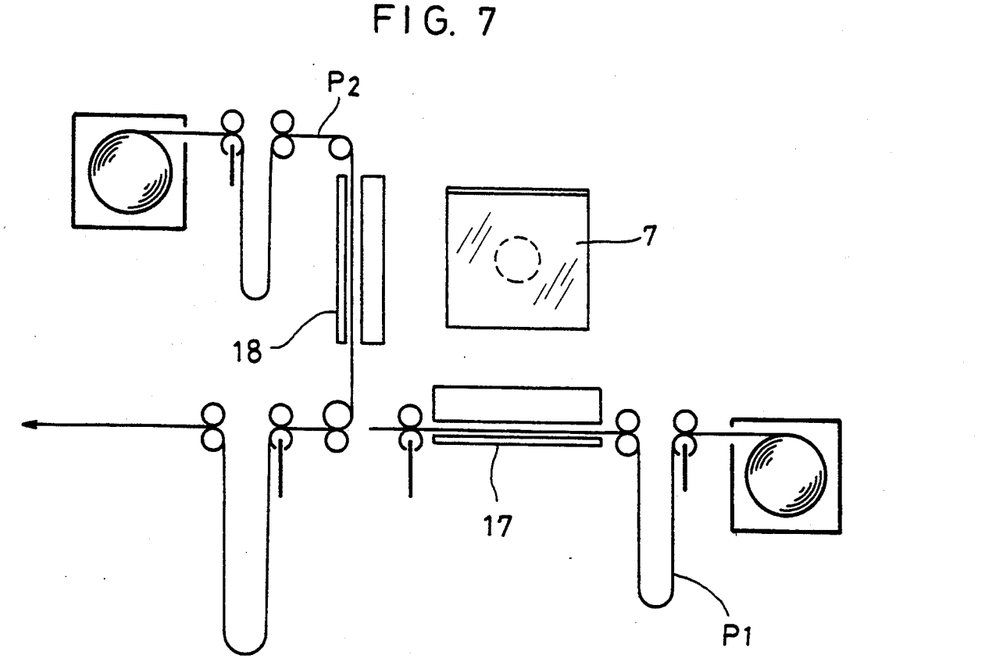
FIG. 7 is a front view of another embodiment of the photographic printer.

In any of the above embodiments, a single web of photographic paper P is pulled out of the magazine 19 and guided through the second exposure stage 18 and then through the first exposure stage 17 to print the images either laterally or longitudinally on single paper P. But as shown in FIG. 7, two separate webs of photographic paper P1 and P2 may be fed separately to the first exposure stage 17 and the second exposure stage 18, respectively, to print images laterally on the paper P1, guided into the first exposure stage 17, and to print images longitudinally on the paper P2, guided into the second exposure stage 18.

Figure 8:
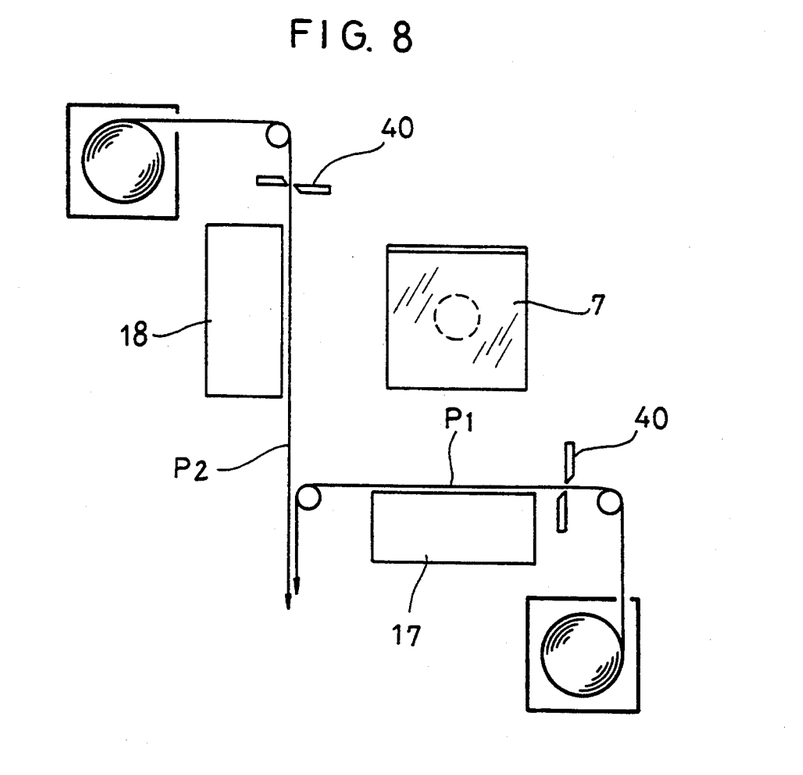
FIG. 8 is a front view of still another embodiment of the photographic printer.

In the embodiment shown in FIG. 8, cutters 40 are provided along the feed paths of the paper webs P1 and P2. The first exposure stage 17 and the second exposure stage 18 are suction boxes capable of sucking the paper webs P1 and P2. By cutting the paper webs P1 and P2 to predetermined lengths with the cutters 40, lateral printing and longitudinal printing can be done alternately and continuously.

What is claimed is:

1. A photographic printer comprising a light source unit for emitting light against a negative image surface on a negative film fed in one direction, a reflecting member aligned with the line connecting said light source unit and the negative image surface and inclined by a predetermined angle with respect to the optical axis of the light emitted from said light source unit, driving means for turning said reflecting member about said optical axis between a reference position and a second position, locking means for locking said reflecting member in one of said reference position and said second position, and exposure stages disposed on the optical axis of the light reflected by said reflecting member when it is in said reference position and in said second position, the negative film being fed to one of said exposure stages.

* * * * *